(12) United States Patent
Dodds

(10) Patent No.: US 10,030,793 B2
(45) Date of Patent: Jul. 24, 2018

(54) FLEXIBLE PIPE BODY AND METHOD OF PRODUCING SAME

(75) Inventor: Neville Dodds, Tyne and Wear (GB)

(73) Assignee: GE Oil & Gas UK Limited, Bristol (GB)

( * ) Notice: Subject to any disclaimer, the term of this patent is extended or adjusted under 35 U.S.C. 154(b) by 294 days.

(21) Appl. No.: 14/000,268

(22) PCT Filed: Feb. 24, 2012

(86) PCT No.: PCT/GB2012/050427
§ 371 (c)(1),
(2), (4) Date: Aug. 19, 2013

(87) PCT Pub. No.: WO2012/131315
PCT Pub. Date: Oct. 4, 2012

(65) Prior Publication Data
US 2014/0007970 A1    Jan. 9, 2014

(30) Foreign Application Priority Data
Mar. 25, 2011   (GB) .................................. 1105067.1

(51) Int. Cl.
*F16L 11/00* (2006.01)
*B29C 53/58* (2006.01)
(Continued)

(52) U.S. Cl.
CPC ............ *F16L 11/00* (2013.01); *B29C 53/582* (2013.01); *B29C 53/64* (2013.01); *B29D 23/001* (2013.01);
(Continued)

(58) Field of Classification Search
CPC .............................. F16L 11/00; B29D 23/001
(Continued)

(56) References Cited

U.S. PATENT DOCUMENTS

| 3,531,357 A | 9/1970 | Heckly |
| 5,225,021 A * | 7/1993 | Lona .................. B29C 37/0032 156/171 |

(Continued)

FOREIGN PATENT DOCUMENTS

| EP | 0147288 A2 | 7/1985 |
| EP | 0246360 A1 | 11/1987 |

(Continued)

OTHER PUBLICATIONS

International Search Report, PCT/GB2012/050427, dated May 11, 2012 (3 pages).

(Continued)

*Primary Examiner* — Vishal Pancholi
(74) *Attorney, Agent, or Firm* — Reza Mollaaghababa; Thomas J. Engellenner; Pepper Hamilton LLP

(57) ABSTRACT

To produce a flexible pipe body, a length of tensile armour element (300) of pre-preg composite material is fed towards a fluid-retaining layer (602). The tensile armour element (300) passes through a guide (604) an a pre-heater (606). The tensile armour element (300) is then applied to the fluid-retaining layer (602), being wrapped around the fluid-etaining layer (602) by virtue of the rotation of the layer (602), the linear translation of the layer (602), and the fixed position of the tensile armour element feed (601). The element (300) is fed to the fluid-retaining layer under a constant, predetermined controlled tension. Positioning head (608) helps to position the element (300) on the fluid-retaining layer (602). As tensile armour element is wound onto the pipe body, the pipe body continues to move in a, linear direction and the pipe body moves through an oven (610).

16 Claims, 6 Drawing Sheets

(51) Int. Cl.

| | |
|---|---|
| *B29C 53/64* | (2006.01) |
| *F16L 11/08* | (2006.01) |
| *B29D 23/00* | (2006.01) |
| B29C 61/00 | (2006.01) |
| B29C 63/10 | (2006.01) |
| B29K 105/24 | (2006.01) |
| F16L 11/04 | (2006.01) |

(52) U.S. Cl.
CPC ........... *F16L 11/081* (2013.01); *B29C 61/006* (2013.01); *B29C 63/10* (2013.01); *B29K 2105/243* (2013.01); *F16L 2011/047* (2013.01)

(58) Field of Classification Search
USPC .................................................. 138/129, 144
See application file for complete search history.

(56) References Cited

U.S. PATENT DOCUMENTS

| | | | | |
|---|---|---|---|---|
| 5,765,600 | A * | 6/1998 | Newaz | ...................... F16L 9/14 |
| | | | | 138/125 |
| 6,276,401 | B1 * | 8/2001 | Wilson | ................ F16L 58/1063 |
| | | | | 138/172 |
| 6,390,141 | B1 * | 5/2002 | Fisher | ................... F16L 11/088 |
| | | | | 138/125 |
| 8,082,954 | B2 * | 12/2011 | Rytter | ................... B29C 53/582 |
| | | | | 138/126 |
| 2003/0183293 | A1 | 10/2003 | Fraser | |
| 2009/0218093 | A1 * | 9/2009 | Gudme | ..................... B32B 1/08 |
| | | | | 166/244.1 |
| 2011/0192485 | A1 * | 8/2011 | Graham | ................. F16L 11/083 |
| | | | | 138/129 |
| 2011/0214771 | A1 * | 9/2011 | Graham | .................. E21B 17/01 |
| | | | | 138/109 |

FOREIGN PATENT DOCUMENTS

| | | |
|---|---|---|
| EP | 2056007 A2 | 5/2009 |
| EP | 2056007 A3 | 3/2012 |
| FR | 2590646 A1 | 5/1987 |
| GB | 1299878 A | 12/1972 |
| WO | 0070256 | 11/2000 |
| WO | 0070256 A1 | 11/2000 |
| WO | 2006097112 A2 | 9/2006 |
| WO | 2010041047 A2 | 4/2010 |
| WO | 2010055324 A1 | 5/2010 |
| WO | 2010133879 A1 | 11/2010 |
| WO | 2013093404 A1 | 10/2012 |

OTHER PUBLICATIONS

PCT International Preliminary Report on Patentability, dated Oct. 1, 2013 (7 pages).
Office Action dated Feb. 23, 2015 corresponding to European Application No. 12706901.1 (5 sheets).
Chinese Office Action for Chinese Application No. 2012800093556 dated Apr. 28, 2015.
English translation of Chinese Office Action for corresponding Chinese Application 2012800093556, dated Jan. 15, 2016.
Examination Report for corresponding Australian Application 201223600, dated May 27, 2016.
European Examination Report for corresponding European Application 12706901.1 dated Sep. 6, 2016.

* cited by examiner

FLEXIBLE PIPE BODY AND METHOD OF PRODUCING SAME

The present invention relates to a flexible pipe body and a method of producing a flexible pipe body. In particular, but not exclusively, the present invention relates to the use of composites, particularly fibre reinforced polymeric materials, in an armour layer of a flexible pipe body.

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires.

In many known flexible pipe design the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the pressure armour and tensile armour layers of the flexible pipe body is increased.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage. The economics and logistics of transporting and installing flexible pipe become untenable.

One technique which has been used in the past to in some way alleviate the above-mentioned problem is the use of fibre-reinforced polymeric material (or composites) as structural elements in flexible pipes. Composites provide a high specific strength and stiffness and can enable reduced pipe weight (reducing top tension), and increase chemical resistance of the pipe compared to known metallic materials. The composite may be initially provided as a "pre-preg", i.e. pre-impregnated with fibres.

Thermoset composites employing high-strength, high-stiffness fibres are not ductile and cannot be plastically deformed like metals and have a limited ultimate strain in the order of 2% or less. Composite materials for making sections with reasonable dimensions therefore pose difficulties in the manufacturing process. A thermosetting material is defined as a material that cannot be re-melted after curing. A thermosetting material is the material in its uncured or partially cured state. A thermosetting composite that has been cured is herein defined as thermoset. A thermosetting composite may be formed into a tape and heated to cure the material. However, when the formed tape is wound to create a layer of a tubular pipe body, strain is introduced into the material, which affects performance. During winding onto a cylindrical base, a tape is bent in two planes, which can cause warping.

US2003/0026928 discloses a flexible pipe including composite tapes of fibres and thermoset resin. The tape is formed of thin, superimposed laminates bonded together by an adhesive. Using thin laminates helps to reduce strain when the layer is bent onto a pipe body surface. However, strain is not completely eliminated, and also the layer thickness, adhesive coverage and application timing must be carefully controlled. Also, in use, a layer of bonded laminates would be susceptible to inter-laminate shear as interfaces interact during movement of the pipe or twisting of the layer.

It is an aim of the present invention to at least partly mitigate the above-mentioned problems.

It is an aim of embodiments of the present invention to provide layers in a flexible pipe body, of composite material that gives strength and stiffness to a pipe to avoid crushing or burst-through, whilst also giving sufficient flexibility to the pipe as it bends.

It is an aim of embodiments of the present invention to provide armour layers in a flexible pipe body of composite material that are substantially free of residual strain.

It is an aim of embodiments of the present invention to provide a tensile armour layer and/or pressure armour layer that is protected against adhesion to neighbouring wires, abrasion and environmental factors such as temperature and chemicals.

According to a first aspect of the present invention there is provided a method of producing a flexible pipe body, comprising:
  providing a length of thermosetting composite material;
  helically wrapping the length, under a predetermined tension, around a fluid-retaining layer;
  and then heating the length to cure the thermosetting composite material.

According to a second aspect of the present invention there is provided a flexible pipe body, comprising:
  a fluid-retaining layer; and
  at least one armour layer comprising a length of thermosetting composite material, provided over the fluid-retaining layer, wherein the armour layer is formed by helically wrapping the length, under a predetermined tension, around the fluid-retaining layer and then heating the length to cure the thermosetting material.

Certain embodiments of the invention provide the advantage that the armour layer is formed substantially or completely free of residual strain, because the length of material is cured 'in situ', i.e. not formed into a new position after the curing stage. Certain embodiments of the invention provide a flexible pipe formed with reduced weight and improved performance compared to pipes with standard armour layers. The composite material provides high strength at a controlled weight. Specific materials can be chosen for the required application. It will be appreciated however that the present invention will be particularly suitable for deep and ultra-deep water operation, where pressure on a pipe is higher due to the weight of the long pipe length, as well as the surrounding water itself, and a high strength per unit weight material is paramount.

Embodiments of the invention are further described hereinafter with reference to the accompanying drawings, in which.

In the drawings like reference numerals refer to like parts.

Figure 1:
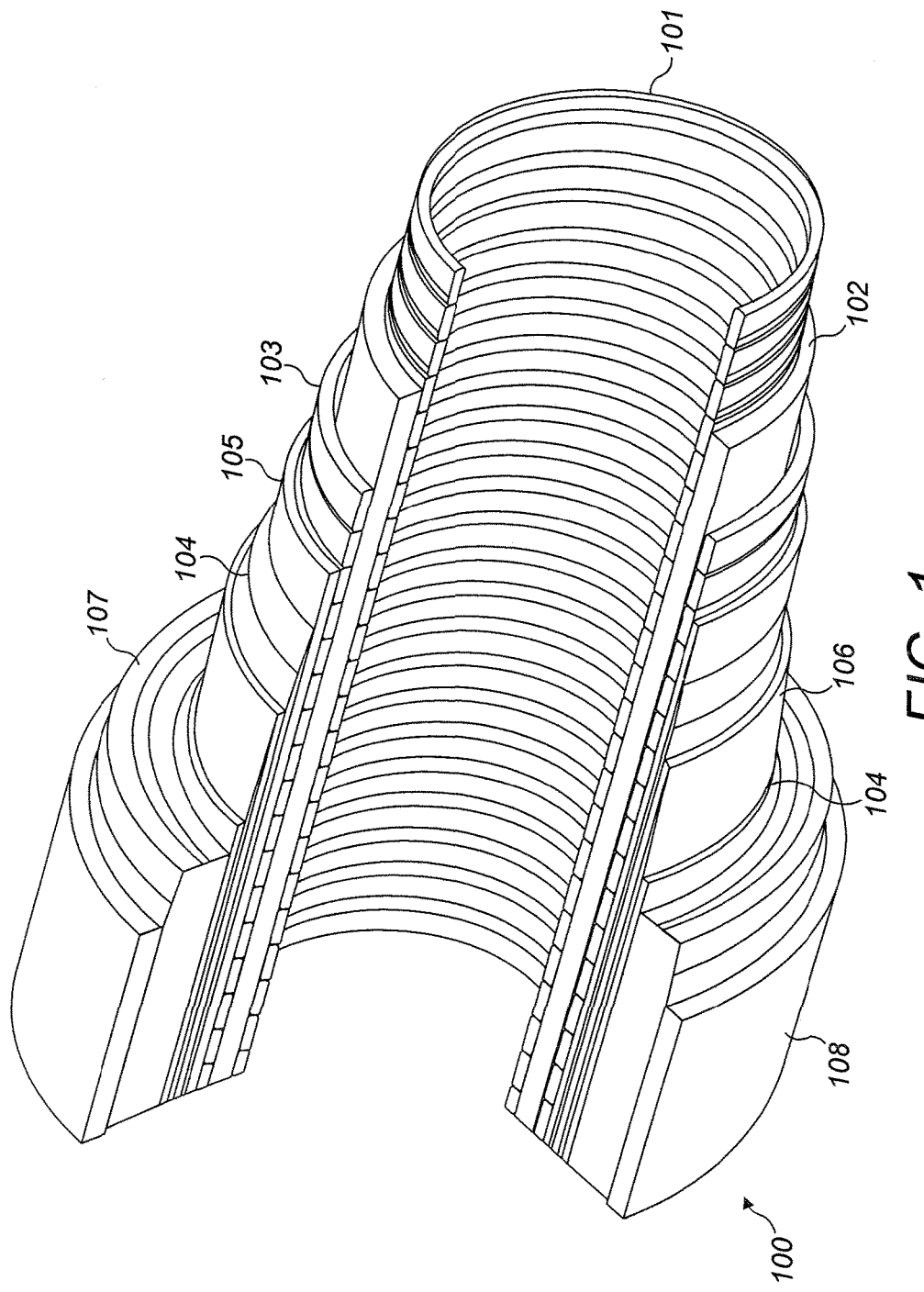
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
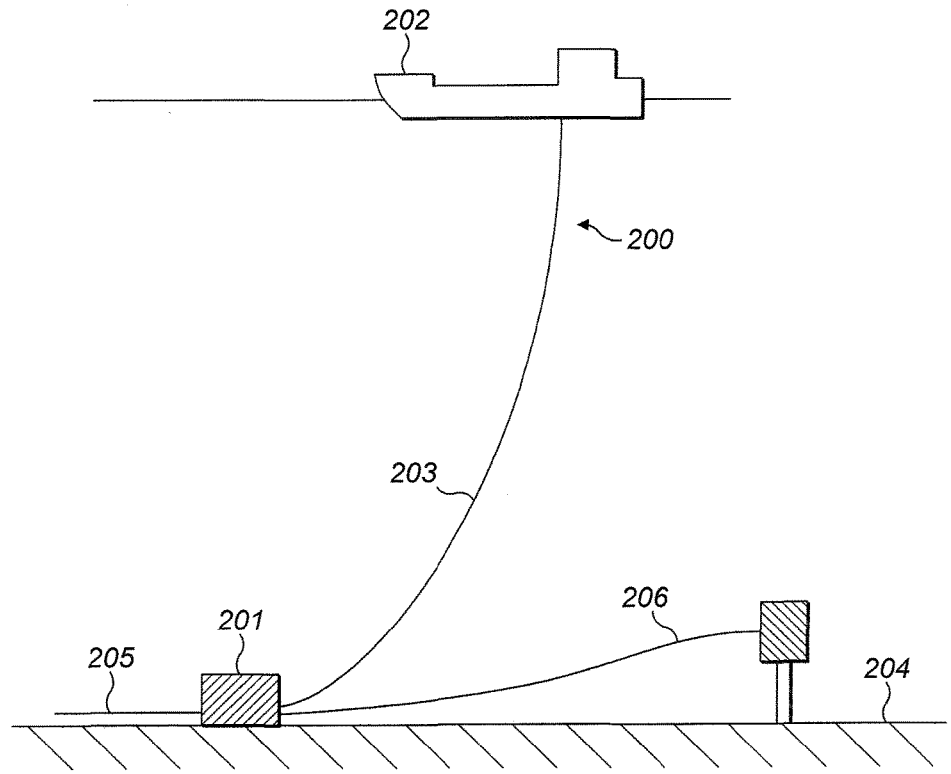
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3A:
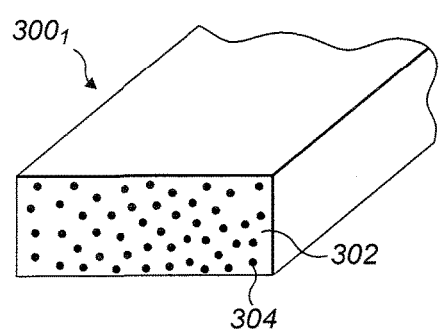
FIGS. 3a and 3b illustrate tensile armour elements.
Figure 3B:
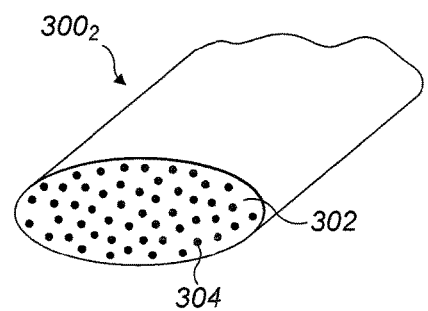

FIGS. 3a and 3b illustrates an example of an element for forming a tensile armour layer of the present invention. The element $300_1$ or $300_2$, which in the art can be called a tape, includes a composite matrix material 302 and reinforcing fibres 304. The relative dimensions, cross-sectional shape and ratio of matrix material to fibres are illustrated for example, and can be made to suit the particular application. The cross-sectional shape of the element can be substantially rectangular, substantially oval, substantially circular, etc, or could be made of two or more corresponding pieces, or any other cross-section.

Figure 4:
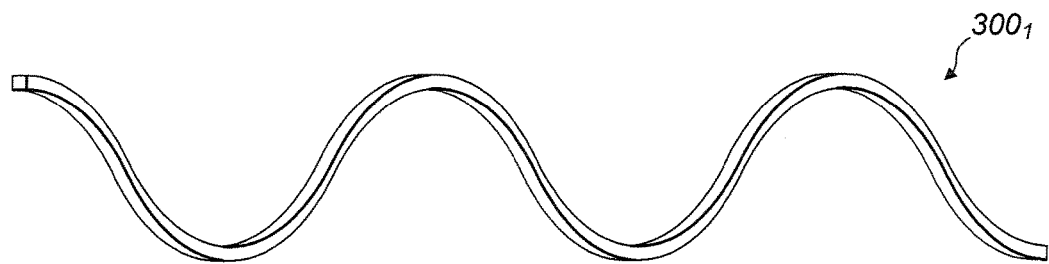
FIG. 4 illustrates a tensile armour element in its wrapped position.
Figure 5:
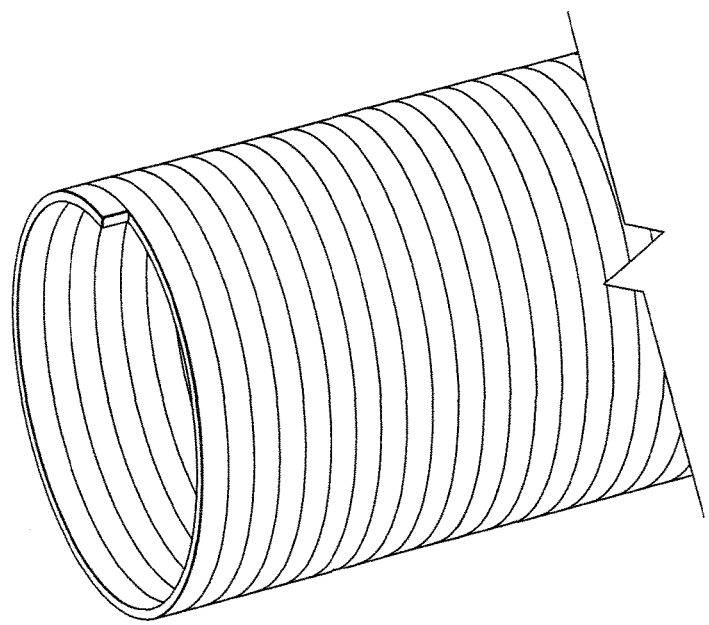
FIG. 5 illustrates a pressure armour element in its wrapped position.

One or more element forms a tensile armour layer by helically wrapping the element around a radially inner layer, such as in the form shown in FIG. 4. In typical use the tensile armour elements are wound at a lay angle of 10 to 55°. Alternatively, when the invention is directed to a pressure armour layer of a flexible pipe body, the armour element can be wound at a lay angle of close to 90°, as shown in FIG. 5.

The composite matrix material 302 is, in this example, epoxy resin and the reinforcing fibres 304 are carbon fibre. The composite of matrix material and fibres can be obtained in pre-preg form from Zoltek Companies, Inc. This pre-preg is available in a partially cured state, with curing having been chemically retarded to enable easy handling, a continuous pre-preg material with even, minimal stress distribution over the material. The ratio of matrix to fibre (volume fraction of fibres) is around 50%. However, many thermosetting pre-preg materials may be suitable such as thermosetting, polyimides, bismaleimides, phenolics and modified epoxies. The reinforcing fibres could be any suitable fibre such as glass, ceramic, metal, polymeric fibres such as aramid, or mixtures thereof. The volume fraction of fibres could be any amount from around 40% to around 75%, aptly around 40% to 65%. The composite may further include other modifiers such as pigments or plasticizers. Aptly, most of the reinforcing fibres are orientated lengthways along the longitudinal axis of the tensile armour element. Some transverse or angled fibres may be included to help stabilize the structure. For example, more than 50%, or 60%, or 70%, or 80% or 90%, of the fibres can be aligned in a direction substantially axially with the length of material. Such orientation can help to stabilize the armour element during use.

Figure 6:
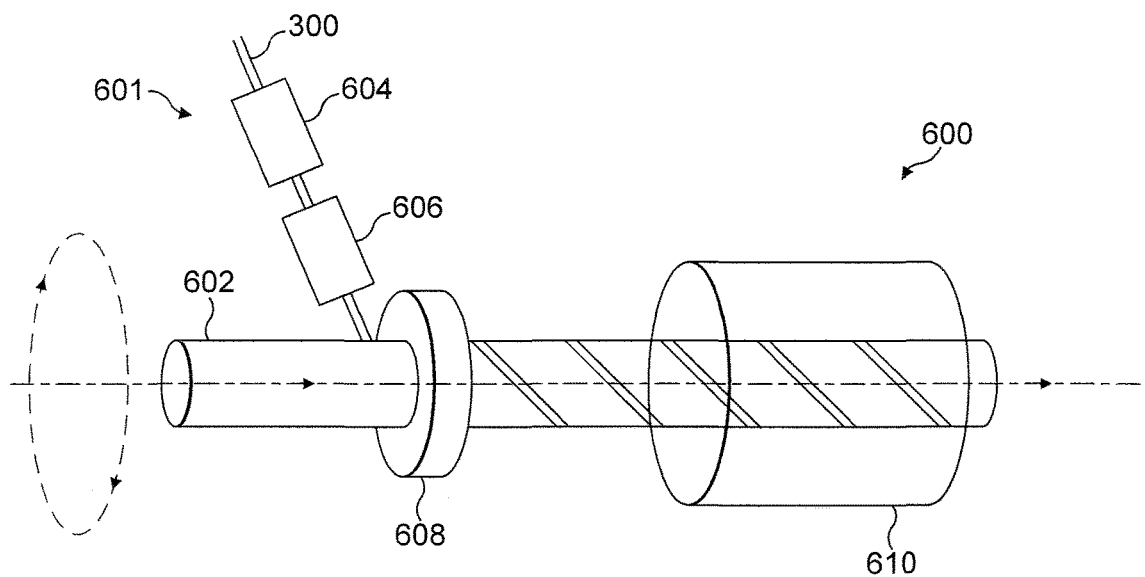
FIG. 6 illustrates apparatus for producing a pipe body.

FIG. 6 shows apparatus 600 for producing a flexible pipe body including the tensile armour element shown in FIGS. 3a and 4.

To produce a flexible pipe body, a length of tensile armour element 300 of pre-preg composite material is fed towards a fluid-retaining layer 602. Optionally a removable mandrel could be employed as an innermost base to apply layers circumferentially thereto. The fluid-retaining layer 602 is rotated in a clockwise direction if viewing from the left hand side as shown, and at a suitable predetermined rotational speed. The fluid-retaining layer 602 is also moved at a constant predetermined speed in a direction shown by arrow A. Of course alternatively the length of tensile armour element could be rotated around a stationary fluid-retaining layer.

The tensile armour element 300 passes through a guide 604 and a pre-heater 606 in this embodiment (though these features of the apparatus are optional). The guide 604 assists in locating the element 300 correctly, and the pre-heater 606 helps to soften the pre-preg material slightly for application onto the fluid retaining layer 602.

The tensile armour element 300 is then applied to the fluid-retaining layer 602, being wrapped around the fluid-retaining layer 602 by virtue of the rotation of the layer 602, the linear translation of the layer 602, and the fixed position of the tensile armour element feed 601. The element 300 is fed to the fluid-retaining layer under a constant, predetermined controlled tension of 100N. The tension may be altered on a case by case basis to suit the materials and dimensions of the armour element. The predetermined tension is greater than zero, and may be between 50 to 1000N, for example, 50 to 150N, 50 to 250N or 50 to 500N, for example.

Although only one armour element feed 601 is shown, further feeds can be used so as to allow further armour elements to be wound onto the pipe body. Further armour elements will increase the number (and relative density) of armour elements in the layer. A suitable number of elements can be chosen such that the elements have enough clearance so as not to overlap and abrade each other, yet provide sufficient tensile support to the flexible pipe. It will be appreciated that a further layer of tensile armour elements could be provided over the first layer of tensile armour elements by counter-winding elements in the opposite direction to the first layer, for example.

Positioning head 608 helps to position the element 300 on the fluid-retaining layer 602.

As tensile armour element is wound onto the pipe body, the pipe body continues to move in a, linear direction (arrow A) and the pipe body moves through an oven 610.

The oven 601 is set to 220° C. to initiate curing of the epoxy resin of the armour element 300, though it will be clear that other temperatures could be chosen, which will affect the curing time of the epoxy, and thus the speed at which the pipe body should travel through the oven.

In this embodiment the thermosetting material is cured in the heating region by the oven. It will be apparent that the thermosetting material could alternatively be cured in other ways, such as by application of other forms of radiation, or chemically cured.

Such 'in-situ' curing of the composite of the armour layer enables an armour layer to be formed substantially or completely free of residual strain within the material, because the material is not significantly bent or reformed subsequent to curing. The bending radius and twist occurs when the material is in its pre-cured state (which does not affect the material) and no bending or torsional stress is applied to the material post-curing. This gives a higher quality product compared to known armour layers, since the armour element contains more useable strength then known armour elements that contain some residual strain. The product is more efficient than known armour layers in terms of strength per amount of material, and thus a longer pipe for deeper application is possible.

By winding the tensile armour element under a controlled tension, the element receives an amount of consolidation pressure via the mutual radial forces acting between itself and the fluid-retaining layer. This pressure aids the curing process.

A user will be able to consider any shrinkage of the thermoset material when arranging the positioning of the armour elements relative to each other.

Figure 7:
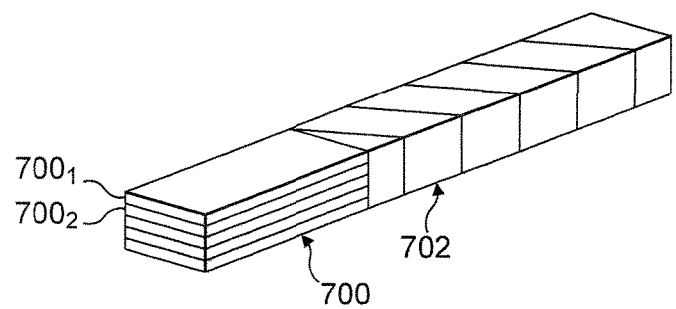
FIG. 7 Illustrates a further tensile armour element.
Figure 8:
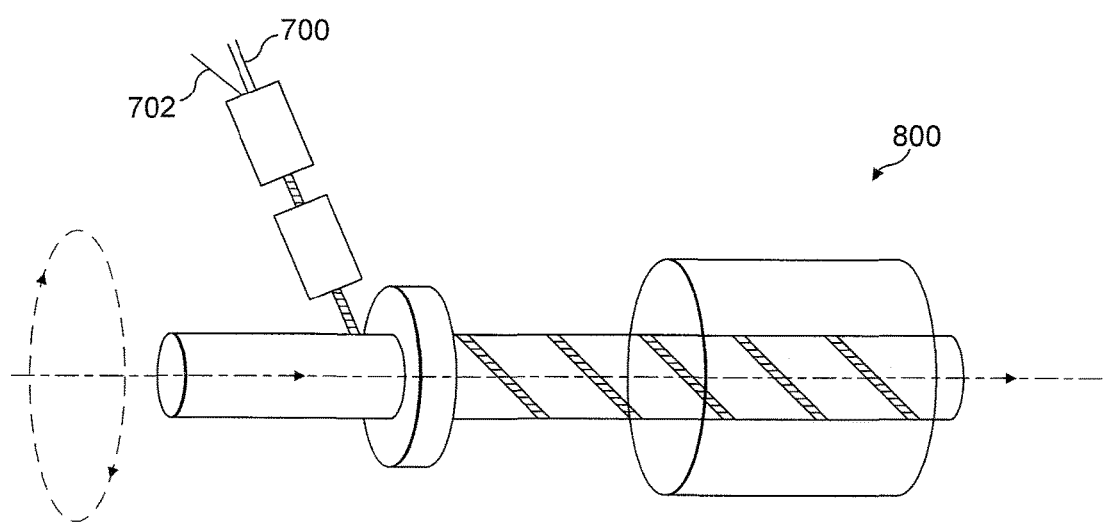
FIG. 8 illustrates further apparatus for producing a pipe body.
Figure 9:
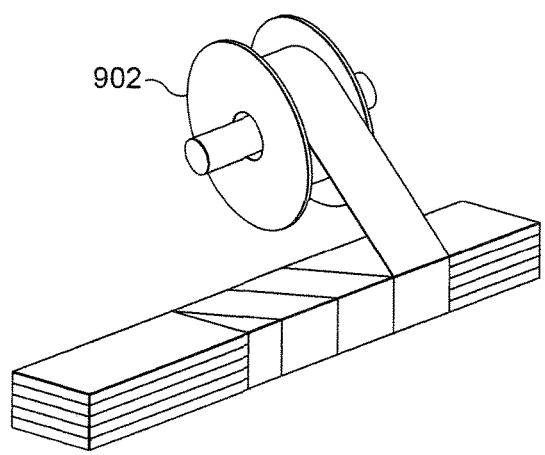
FIG. 9 illustrates the tensile armour element of FIG. 7 being wrapped with tape.

FIG. 8 shows apparatus for producing a flexible pipe body according to a further embodiment of the present invention. The equipment shown in FIG. 8 is similar to the equipment shown in FIG. 6. However, a variation of the tensile armour element is used, as shown in FIGS. 7 and 9.

In this embodiment, a plurality of lengths of composite material are stacked to form a tensile armour element. The precursor lengths may be cut from a sheet of composite pre-preg material that is available for Zoltek Companies, Inc., and then stacked broad side to broad side in a laminate fashion.

Aptly, substantially all of the reinforcing fibres and orientated lengthways along the longitudinal axis of the tensile armour element. Such orientation can help to stabilize the armour element during use. By orientating the fibres in particular directions and/or angles, the spring stiffness of the element can be controlled.

The tensile armour element also includes a heat shrink tape covering and encapsulating the stacked lengths of composite material. The shrink tape is itself a known material, which is a polymeric tape that has previously been treated by heating and stretching in a particular direction giving the tape an oriented form with oriented polymer chains. Application of heat reverses the process, causing the tape to shrink back towards its original position. The tape "Shrink Tite" available from Aerovac Systems Ltd can be used.

A heat shrink sleeve or braided tube sleeve could be used to encapsulate the composite material. However, in this embodiment a heat shrink tape is wound over the stacked composite material with an overlap of about 50%.

The method of producing a flexible pipe body is similar to the method described with respect to FIG. 6. However, the method further includes the initial steps of stacking the lengths of composite $700_1$, $700_2$ to form a tensile armour element, and wrapping heat shrink tape 702 around the stack 700. This wrapping stage can be performed mechanically via spooling means. The remainder of the apparatus 800 functions in the same manner as the apparatus 600 and is operated by the same method as described above.

FIG. 9 illustrates the spooling means 902 in more detail.

By forming the tensile armour element 700 from a stack of elements cut from a flat sheet, the initial alignment of reinforcing fibres can be more carefully controlled and thus more uniformly oriented in a flat sheet. The fibres remain uniformly oriented in the stack.

In addition, by using a stack of elements, the pre-preg material does not stretch or become damaged during bending in the stage of wrapping over the fluid-retaining layer. However, the requirement for very thin layers of composite material (as needed in the prior art) is avoided.

The heat shrink tape works to compress the pre-preg a certain amount, thus applying a consolidating pressure to the pre-preg material. This pressure aids the curing process similarly to the pressure from winding the armour element under tension. The heat shrink tape could be used instead or as well as winding under tension.

In addition, the consolidation pressure from the heat shrink tape also helps to create an excellent bond between the stacked layers of composite material during the curing process, giving a single, consolidated thermoset element after curing.

Furthermore, the heat shrink tape can be used as a protective layer to the armour element, preventing neighbouring elements from bonding together during the curing process. This ensures free movement of the armour elements when the complete structure is subject to bending in use. The heat shrink tape layer may also provide a degree of protection against abrasion between individual wires and a further layer of protection against the permeation of fluids present in the pipe annulus by forming a physical permeation barrier. In an alternate embodiment the heat shrink tape could be removed after the curing stage.

Because the armour element is cured 'in-situ' as in the first embodiment, the same advantages are also achieved, i.e. a lack of residual strain in the formed armour layer.

Both the tensile armour and the pressure armour can be formed continuously by this method, and the cross-section of the element can be chosen to suit the functional layer. For example, the pressure armour element may have a Z-shaped cross-section, enabling the element to interlink with neighbouring sections of element.

With the present invention, pre-preg composite material can be wrapped around a pipe body inner layer, or a mandrel, with little tension, requiring only fairly basic rotating machinery.

Figure 10:
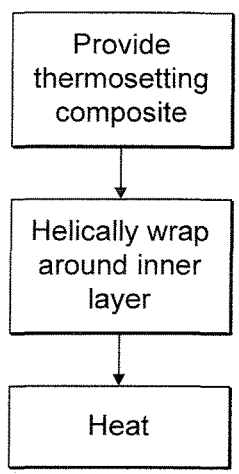
FIG. 10 illustrates a method of producing a pipe body.
Figure 11:
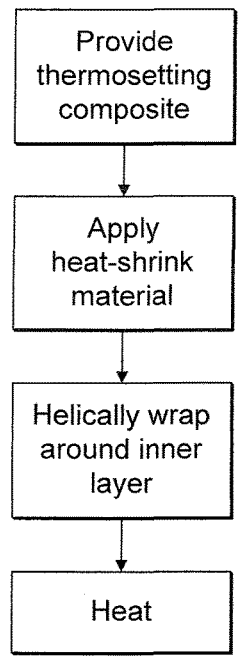
FIG. 11 illustrates a further method of producing a pipe body.
Figure 12:
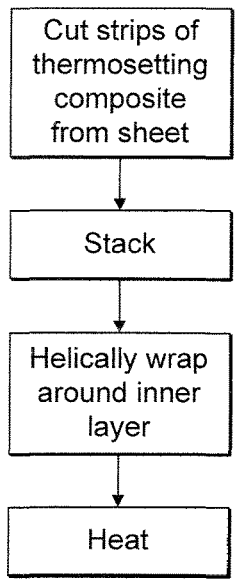
FIG. 12 illustrates a further method of producing a pipe body.
Figure 13:
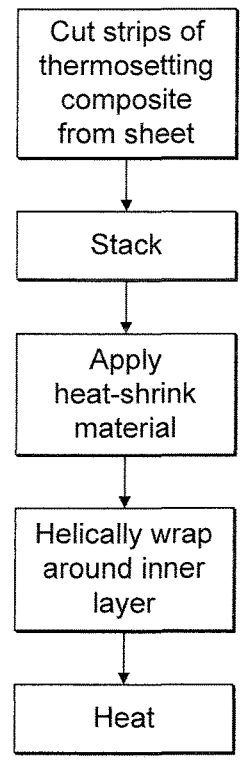
FIG. 13 illustrates a further method of producing a pipe body.

A method of producing a flexible pipe body is illustrated in the flow chart of FIG. 10. A further method is illustrated in the flow chart of FIG. 11. A yet further method is illustrated in the flow chart of FIG. 12. A yet further method is illustrated in the flow chart of FIG. 13.

Various modifications to the detailed designs as described above are possible. For example, the heat shrink tape of FIG. 7 could be modified to include PTFE tape or other low friction material, particularly on the surface, so as to improve friction properties between adjacent elements or adjacent layers. One or more further layers can be added to the flexible pipe body, such as those illustrated in FIG. 1.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of producing a flexible pipe body for transporting production fluids from a sub-sea location, the method comprising:
   providing a plurality of lengths of a thermosetting composite material and stacking the plurality of lengths of the thermosetting composite material to form a tensile armour element;
   applying a heat-shrink tape or a heat-shrink sleeve to the plurality of lengths of the thermosetting composite material;

helically wrapping the tensile armour element, under a predetermined tension, around a fluid-retaining layer; and then heating the tensile armour element to cure the thermosetting composite material and form a bond between the stacked lengths of the thermosetting composite material while preventing neighboring elements of the tensile armour element from bonding together during the curing process;

wherein the tensile armour element forms a structural armour layer, and said armour layer comprises a lay angle in a range of about 10° to about 55°.

2. The method as in claim 1, wherein the thermosetting composite material comprises a thermosetting matrix material and a plurality of reinforcing fibers.

3. The method as in claim 2, wherein more than 50% of the plurality of reinforcing fibers are aligned in a direction substantially axially with the length of the material.

4. The method as in claim 1, wherein the thermosetting composite material is substantially free from residual strain.

5. The method as in claim 1, wherein the predetermined tension is in the range of 100 N to 1000 N.

6. The method as in claim 1, wherein helically wrapping the tensile armour element comprises helically wrapping the length such that adjacent sections of the thermosetting composite material helically wrapped around the fluid-retaining layer do not overlap.

7. The method as in claim 1, wherein helically wrapping the tensile armour element comprises helically wrapping the length such that adjacent sections of the thermosetting composite material helically wrapped around the fluid-retaining layer at least partially overlap.

8. The method as in claim 1, wherein the heat-shrink tape or the heat-shrink sleeve comprises a low friction material.

9. A flexible pipe body for transporting production fluids from a sub-sea location, comprising:

a fluid-retaining layer; and at least one structural armour layer comprising a tensile armour element comprising a plurality of stacked lengths of thermosetting composite material, provided over the fluid-retaining layer, and further comprising a heat-shrink tape or a heat-shrink sleeve over the plurality of stacked lengths of thermostetting composite material;

wherein the armour layer is formed by helically wrapping the tensile armour element, under a predetermined tension, around the fluid-retaining layer and then heating the tensile armour element to cure the thermosetting material and forming a bond between the stacked lengths of the thermosetting material; and wherein said armour layer has a lay angle in a range of about 10° to about 55°.

10. The flexible pipe body as in claim 9, wherein the thermosetting composite material comprises a thermosetting matrix material and a plurality of reinforcing fibers.

11. The flexible pipe body as in claim 10, wherein more than 50% of the plurality of reinforcing fibers are aligned in a direction substantially axially with the length of the material.

12. The flexible pipe body as in claim 9, wherein the armour layer is substantially free from residual strain.

13. The flexible pipe body as in claim 9, wherein the predetermined tension is in the range of 100 N to 1000 N.

14. The flexible pipe body as in claim 9, wherein adjacent sections of the thermosetting composite material helically wrapped over the fluid-retaining layer do not overlap with the armour layer.

15. The flexible pipe body as in claim 9, wherein adjacent sections of the thermosetting composite material helically wrapped over the fluid-retaining layer at least partially overlap with the armour layer.

16. The flexible pipe body as in claim 9, wherein the heat-shrink tape or heat-shrink sleeve comprises a low friction material.

* * * * *